United States Patent
Doernhoefer et al.

(10) Patent No.: US 8,286,776 B2
(45) Date of Patent: Oct. 16, 2012

(54) SYNCHRONIZER RING MADE OF SHEET METAL

(75) Inventors: Martin Doernhoefer, Simmelsdorf (DE); Knut Erdmann, Nuremberg (DE); Meinrad Holderied, Igensdorf (DE)

(73) Assignee: Diehl Metall Stiftung & Co. KG, Nuremberg (DE)

( * ) Notice: Subject to any disclaimer, the term of this patent is extended or adjusted under 35 U.S.C. 154(b) by 79 days.

(21) Appl. No.: 12/942,459

(22) Filed: Nov. 9, 2010

(65) Prior Publication Data

US 2011/0056793 A1    Mar. 10, 2011

Related U.S. Application Data

(63) Continuation of application No. PCT/EP2009/003162, filed on May 2, 2009.

(51) Int. Cl.
*F16D 23/04* (2006.01)
(52) U.S. Cl. .................. 192/107 R; 192/53.34; 192/108
(58) Field of Classification Search ................ 29/893.33
See application file for complete search history.

(56) References Cited

U.S. PATENT DOCUMENTS

| | | | |
|---|---|---|---|
| 2,238,723 A * | 4/1941 | Fishburn | 192/53.34 |
| 4,742,723 A | 5/1988 | Lanzerath et al. | |
| 4,866,831 A | 9/1989 | Lanzerath et al. | |
| 6,547,052 B1 | 4/2003 | Schwuger et al. | |
| 7,134,537 B2 | 11/2006 | Schwuger et al. | |
| 2008/0149450 A1 * | 6/2008 | Christoffer et al. | 192/53.34 |

FOREIGN PATENT DOCUMENTS

| | | |
|---|---|---|
| DE | 3519811 A1 | 12/1986 |
| DE | 19853856 A1 | 5/2000 |
| DE | 202006008636 U1 | 8/2006 |
| DE | 102005060572 A1 | 6/2007 |
| EP | 0821175 A1 | 1/1998 |
| WO | 03062659 A1 | 7/2003 |

OTHER PUBLICATIONS

International Search Report dated Aug. 6, 2009.

* cited by examiner

*Primary Examiner* — Rodney Bonck
(74) *Attorney, Agent, or Firm* — Laurence A. Greenberg; Werner H. Stemer; Ralph E. Locher

(57) ABSTRACT

A sheet-metal synchronizer ring for a synchronizing device has a conical ring body, an outer toothing for blocking the axial movement of a sliding sleeve, and at least one indexing tab which is bent in the axial direction and limits the rotation of the synchronizer ring in a synchronizer hub. The indexing tab has a tab widened portion on at least one side.

17 Claims, 4 Drawing Sheets

SYNCHRONIZER RING MADE OF SHEET METAL

CROSS-REFERENCE TO RELATED APPLICATION

This is a continuation application, under 35 U.S.C. §120, of copending international application No. PCT/EP2009/003162, filed May 2, 2009, which designated the United States; this application also claims the priority, under 35 U.S.C. §119, of German patent application No. DE 10 2008 023 031.6, filed May 9, 2008; the prior applications are herewith incorporated by reference in their entirety.

BACKGROUND OF THE INVENTION

Field of the Invention

The invention relates to a sheet-metal synchronizer ring for a synchronizing device having a conical ring body, an outer toothing for blocking the axial movement of a sliding sleeve, and at least one indexing tab which is bent in the axial direction and limits the rotation of the synchronizer ring in a synchronizer hub.

Sheet-metal synchronizer rings are manufactured from a planar sheet-metal material using a punching and drawing method. As a result, it is not possible to implement any solid axial stops, such as are customary in forged brass synchronizer rings. In order to avoid rotation of a synchronizer ring in the circumferential direction with respect to a synchronizer hub, published, non-prosecuted German patent application DE 35 19 811 A1, corresponding to U.S. Pat. Nos. 4,742,723 and 4,866,831, discloses a sheet-metal synchronizer ring of the generic type in which the axial stops are embodied as indexing tabs which are bent in the axial direction. However, this embodiment is unsuitable for synchronizing devices with annular synchronizer springs since the indexing tabs do not have any bearing faces for limiting the axial migration of the synchronizer springs.

Published, non-prosecuted German patent application DE 10 2005 060 572 A1 discloses a shaped sheet-metal synchronizer ring which has bearing faces for limiting the axial migration of the synchronizer spring. For this purpose, the indexing tabs are formed in the shape of a bead between their side stops. German Utility Model DE 20 2006 008 636 U1 discloses embodiments in which the indexing tabs have material perforations which form a stop for a synchronizer spring. However, both specified embodiments have the disadvantage that they only make available small, virtually punctiform bearing faces for the synchronizer spring. As a result, precise guidance of the synchronizer spring is not provided, which can lead to poor gear-shifting comfort or even to the spring becoming jammed. Furthermore, due to fabrication reasons a gap between the shaped section (bead, perforation) and the outer face of the synchronizer ring on the small diameter of the friction cone thereof remains open, which, in an unfavorable configuration, can also cause the synchronizer spring to jam.

A further problem with a shaped sheet-metal synchronizer ring is the centering of the synchronizer ring in a synchronizer hub. In contrast to the known, forged synchronizer rings made of brass, which have an outer face in a virtually cylindrical form and as a result ensure precise centering in the cylindrically shaped inner cavity of the synchronizer hub, sheet-metal synchronizer rings have, in contrast, a conical outer face of the friction cone for fabrication reasons. Since the synchronizer ring is pushed out from the synchronizer hub axially in the direction of the gearwheel by the sliding sleeve during the gear-shifting process, the centering of a sheet-metal synchronizer ring is lost owing to the tapering of the outer face of the friction cone toward the relatively small diameter. If the centering of a synchronizer ring is lost, this can lead to impairment of the function, together with wear and relatively high drag torques.

German Utility Model DE 20 2006 008 636 U1 describes an embodiment with which a sheet-metal synchronizer ring can be centered. In addition to indexing tabs, additional centering tabs are provided which guide a synchronizer ring in an inner cavity of a synchronizer hub. However, such additional centering tabs are disadvantageous since additional centering tabs can be formed only at the expense of locking teeth which are impressed in the circumferential region. As a result, the number of locking teeth is reduced, which leads to an increase in the specific loading on the top faces of the other locking teeth and ultimately can cause damage to the locking teeth, or even cause them to fracture.

SUMMARY OF THE INVENTION

It is accordingly an object of the invention to provide a synchronizer ring made of sheet metal which overcome the above-mentioned disadvantages of the prior art methods and devices of this general type, which sheet-metal synchronizer ring either ensures centering of the synchronizer ring in an inner cavity of a synchronizer hub, without bringing about greater loading of the locking teeth in the process, or has a bearing face with a large area which bounds an axial movement of a synchronizer spring, wherein the synchronizer ring preferably both ensures the centering and has a bearing face with a large area.

The above-mentioned object is achieved according to the invention by a sheet-metal synchronizer ring for a synchronizing device having a conical ring body, an outer toothing for blocking the axial movement of a sliding sleeve, and at least one indexing tab which is bent in the axial direction and limits the rotation of the synchronizer ring in a synchronizer hub. The indexing tab has a tab widened portion on at least one side.

In other words, a sheet-metal synchronizer ring for a synchronizing device has a conical ring body, an outer toothing for blocking the axial movement of the sliding sleeve and at least one indexing tab which is bent in the axial direction and engages in associated cutouts in the synchronizer hub. The side faces of the indexing tab function as a rotation stop and interact with the side faces of the cutout, with the result that rotation of the synchronizer ring in the circumferential direction is limited. The sheet-metal synchronizer ring also has at least one indexing tab which has a tab widened portion on at least one side. However, the sheet-metal synchronizer ring preferably has three indexing tabs.

It is particularly advantageous that the tab widened portion which is formed on the indexing tab brings about an increase in the mechanical strength of the indexing tab. A further advantage of the tab widened portion is that the number of locking teeth can be kept constant and in this way it is possible to distribute the acting forces over a relatively large number of locking teeth, which are therefore loaded to a lesser degree and have greater stability.

Such a synchronizer ring is used both in single synchronization and in multiple synchronization, wherein the synchronizer ring is referred to in the case of multiple synchronization as an outer ring or as an external synchronizer ring.

In one advantageous embodiment, the tab widened portion is embodied as a centering element for centering the synchronizer ring in a synchronizer hub. The tab widened portion which is embodied as a centering element causes the conical ring body and therefore also the synchronizer ring to be mounted in a centered fashion in a cylindrically formed inner cavity of a synchronizer hub. As a result, the synchronizer ring can be displaced in the axial direction during the gear-shifting process without the centering being impaired. This ensures disruption-free operation of the synchronizer ring.

In one preferred alternative, the tab widened portion adjoins the indexing tab in the circumferential direction or in the axial direction with respect to the ring body. By virtue of the fact that the tab widened portion adjoins the indexing tab in the circumferential direction or in the axial direction with respect to the ring body, the tab widened portion can be particularly advantageously configured in accordance with the geometric requirements. In one advantageous embodiment, the tab widened portion which adjoins the indexing tab in the circumferential direction with respect to the ring body adjoins on both sides of the indexing tab. For disruption-free functioning of the synchronizer ring, it is, however, sufficient if the tab widened portion adjoins on only one side of the indexing tab in the circumferential direction with respect to the ring body. The tab widened portion which adjoins the indexing tab in the axial direction can be embodied so as to be at least partially slit up to the indexing tab, or else slit-free.

In a further embodiment, the tab widened portion is oriented partially radially and partially in the circumferential direction with respect to the ring body. It is advantageous with this orientation of the tab widened portion that tab widened portions can be manufactured which are easy to shape and at the same time have a high strength here.

That part of the tab widened portion which is oriented in the circumferential direction advantageously bears against the outer cone of the ring body. This ensures that a synchronizer ring which is configured in such a way can easily be inserted into a conventional synchronizing device without the geometric conditions of the synchronizing device having to be changed. The part of the tab widened portion which is oriented in the circumferential direction bears on the outside of the conical ring body and is supported on the ring body. In this way, the tab widened portion contributes to increasing the strength of the indexing tab.

In a further embodiment, the indexing tab and the tab widened portion have essentially the same thickness of material as the rest of the synchronizer ring. Owing to identical thickness of material of the indexing tab, tab widened portion and the rest of the synchronizer ring it is not necessary to carry out further shaping steps for changing the thickness of the material during the manufacture of the synchronizer ring, which reduces the manufacturing costs.

The side, facing away from the ring body, of the part of the tab widened portion which is oriented in the circumferential direction expediently forms an obtuse angle ($\alpha$) with a toothing collar which bears the outer toothing. In this way, it is advantageously possible to implement a simple, cost-effective embodiment of a sheet-metal synchronizer ring. The synchronizer ring can be centered with an obtuse angle $\alpha$ of 90.5° to 95°, preferably of 91° to 93°. With an obtuse angle $\alpha$ of greater than 95°, the tab widened portion has just one bearing face for a synchronizer spring.

In one particularly advantageous development, that part of the tab widened portion which is oriented in the circumferential direction is stamped in a wedge shape. The wedge-shaped stamping of that part of the tab widened portion which is oriented in the circumferential direction permits two technical conditions to be easily implemented. On the one hand, the outer diameter of the tab widened portion can be precisely adapted to the diameter of the inner cavity of the synchronizer hub used by defined stamping, that is to say by changing the thickness of the material of the tab widened portion, and on the other hand the outer face of the tab widened portion can be configured in such a way that it centers the synchronizer ring in the synchronizer hub.

The side, facing away from the ring body, of the part of the tab widened portion which is oriented in the circumferential direction advantageously forms an acute angle ($\beta$) or a right angle with a toothing collar which bears the outer toothing. If an acute angle is present, the centering takes place essentially at the upper edge of that part of the tab widened portion which points in the circumferential direction. If a right angle is present, the outer face of the tab widened portion has at least partially cylindrical configuration.

In one advantageous development, that part of the tab widened portion which is oriented in the circumferential direction is connected to the outer cone of the ring body in a materially joined fashion, in particular by soldering, welding or bonding, or in a form locking fashion. The materially joined or form locking connection of the tab widened portion to the ring body increases further the strength of the synchronizer ring when necessary. A form-locking connection is one that connects two elements together due to the shape of the elements themselves, as opposed to a force-locking connection, which locks the elements together by force external to the elements.

In one preferred alternative, the tab widened portion has a bearing face for limiting the axial migration of a spring element. The tab widened portion is particularly advantageous since it provides a sufficiently large bearing face for a synchronizer spring which is possibly used in a synchronization device, as a result of which precise guidance of the spring is brought about, leading to good gear-shifting comfort. The synchronizer spring is prevented from jamming and a reliable function is provided.

In one particularly advantageous embodiment, the tab widened portion serves simultaneously as a centering element for centering the synchronizer ring in a synchronizer hub and as a bearing face for limiting the axial migration of a spring element.

In a further embodiment, the tab widened portion is of stepped shape. A stepped shape of the tab widened portion can be manufactured particularly easily by shaping.

In a further configuration, the tab widened portion which adjoins the axial side of the indexing tab is bent in the radial direction with respect to the ring body.

In another embodiment, the tab widened portion which adjoins the axial side of the indexing tab is bent in the circumferential direction. This produces a particularly stable indexing tab.

The synchronizer ring, the indexing tab and the tab widened portion are expediently fabricated in one piece. The starting material is a planar piece of sheet metal from which the synchronizer ring with all its components is fabricated by shaping. Since the synchronizer ring is in one piece it does not require any complex fitting-in steps or attachment steps for the integrally formed-on components.

In one advantageous development, that part of the tab widened portion of the indexing tab which is oriented in the circumferential direction is spaced apart from that part of the tab widened portion of the adjacent indexing tab which is oriented in the circumferential direction. As a result, the mass of the synchronizer ring is reduced and the expenditure on adapting that part of the tab widened portion which points in the circumferential direction to the outer cone and to the curvature of the ring body is reduced.

In an alternative embodiment, that part of the tab widened portion of the indexing tab which is oriented in the circumferential direction is so long that it is in contact with the corresponding part of the tab widened portion of the adjacent indexing tab. This causes the synchronizer ring to be guided in the synchronizer hub along the entire outer face of the tab widened portion.

Other features which are considered as characteristic for the invention are set forth in the appended claims.

Although the invention is illustrated and described herein as embodied in a synchronizer ring made of sheet metal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
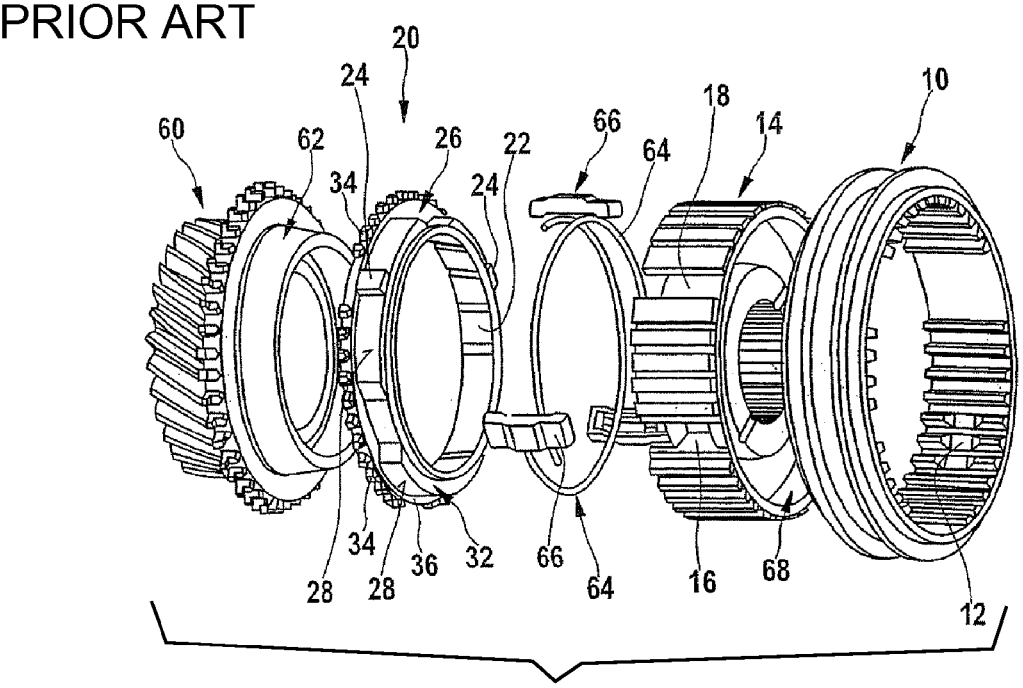
FIG. 1 is a diagrammatic, exploded perspective view of customary components of a synchronizing unit.

Referring now to the figures of the drawing in detail and first, particularly, to FIG. 1 thereof, there is shown a known synchronizing unit with the components which are most important for synchronization. The synchronizing unit has a sliding sleeve 10, a synchronizer hub 14 and a gearwheel 60 with a friction cone 62 connected thereto. The friction cone 62 interacts with a conical ring body 22 of a synchronizer ring 20 which is fabricated from brass, and the friction cone 62 builds up a frictional torque between the synchronizer ring 20 and the friction cone 62. In the illustrated example, the synchronizing unit has synchronizer springs 64 which are embodied in an annular shape between the synchronizer ring 20 and the synchronizer hub 14 and to which three pressure elements 66 are attached. The pressure elements 66 project, on the one hand, into a recess 26 in the synchronizer ring 20 and, on the other hand, into a first circumferential recess 16 in the synchronizer hub 14. The synchronizer springs 64 are pressed against the sliding sleeve 10. Each pressure element 66 has a raised latching projection which is arranged in a latching contour 12 of the sliding sleeve 10.

The axial movement of the sliding sleeve 10 causes the pressure elements 66 and the synchronizer springs 64 to be entrained axially via the latching contour 12 of the sliding sleeve 10 during the gear-shifting process. The axial mobility of the synchronizer spring 64 has to be limited here at the synchronizer ring 20 by a correspondingly configured bearing face 32. Owing to the axial movement of the sliding sleeve 10, the pressure elements 66 press the synchronizer ring 20 axially in the direction of the friction cone 62 of the gearwheel 60, as a result of which a pre-synchronizing force is built up and the synchronizer ring 20 is rotated into a defined locking position in the circumferential direction owing to the frictional torque which is produced.

The locking position is predefined by axial stops 24 which project into assigned cutouts 18 in the synchronizer hub 14. The side faces of the axial stop 24 interact with the side faces of the assigned cutouts 18 and in this way form a form-locking connection to the synchronizer hub 14. The ring body 22 of a forged synchronizer ring 20 has an outer face 28 which includes a virtual right angle with a toothing collar 36, or in other words has a shape which is virtually cylindrical, as a result of which precise centering occurs in a cylindrically shaped inner cavity 68 in the synchronizer hub 14.

Figure 2:
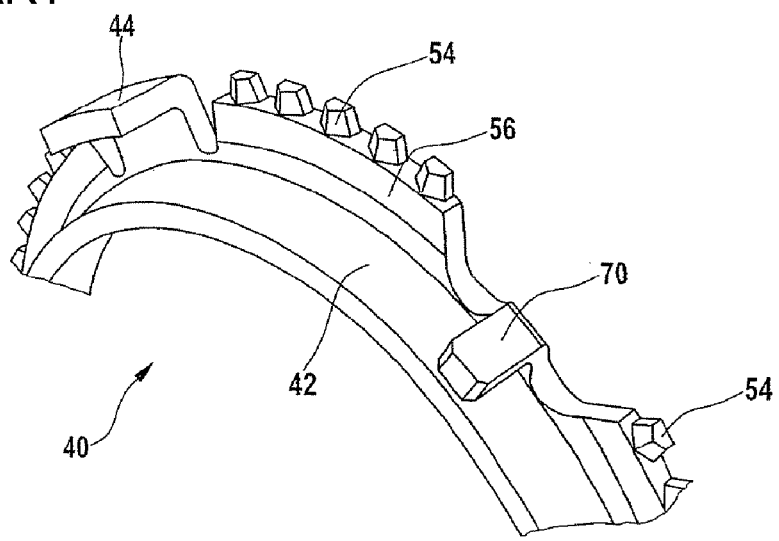
FIG. 2 is a diagrammatic, perspective view of a sheet-metal synchronizer ring with a centering device according to the prior art.

FIG. 2 shows an illustration of a detail of a sheet-metal synchronizer ring 40 which is known from the prior art. The synchronizer ring 40 which is manufactured from planar sheet-metal material using a punching and drawing method has three indexing tabs 44 which are bent in the axial direction (only one of which is shown) which function as axial stops and whose side faces interact with the side faces of three assigned cutouts 18 in a synchronizer hub 14 and limit rotation of the synchronizer ring 40 with respect to the synchronizer hub 14 in the circumferential direction. The ring body 42 is conical both on its inner side and on its outer side. As a result of the decreasing diameter of the conical ring body 42, it is initially not possible to center the synchronizer ring 40 in the cylindrical inner cavity 68 in a synchronizer hub 14.

In order to ensure the centering of the synchronizer ring 40, three additional centering tabs 70 are formed next to the three indexing tabs 44, on those sides of the additional centering tabs 70 which face away from the ring body 42 the synchronizer ring 40 is guided in the inner cavity 68 of the synchronizer hub 14, and in this way centered. However, with respect to additional centering tabs 70 it is unfavorable that additional centering tabs 70 can be formed only at the expense of the locking teeth 54 which are located in the circumferential region of the synchronizer ring 40. It is not possible to form any locking teeth 54 in the region of a toothing collar 56 of the synchronizer ring 40 in which a centering tab 70 is located. This smaller number of locking teeth 54 leads to an increase in the specific loading on the top faces of the other locking teeth 54, which can cause damage to the locking teeth 54 or even cause them to fracture.

Figure 3:
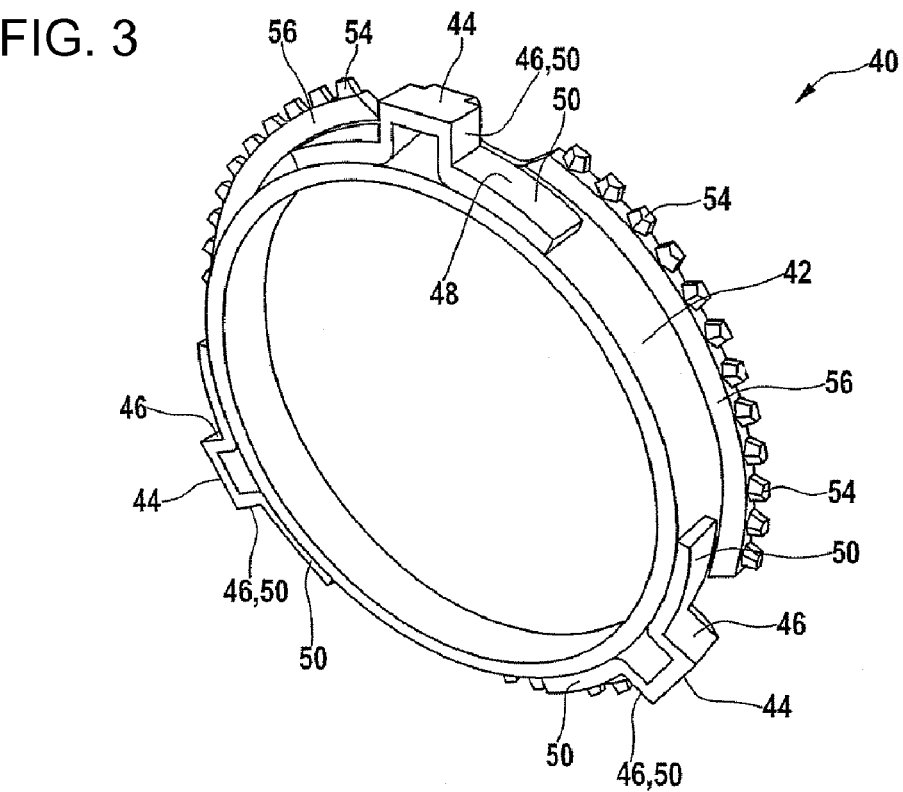
FIG. 3 is a diagrammatic, perspective view of a first embodiment of a sheet-metal synchronizer ring according to the invention.

A first embodiment of the sheet-metal synchronizer ring 40 is illustrated in FIG. 3. The synchronizer ring 40 has a conical ring body 42, at the lower end of which a toothing collar 56, which bears an outer toothing 54 which is interrupted by indexing tabs 44, is arranged. The sheet-metal synchronizer ring 40 has the preferred number of three indexing tabs 44 which are bent in the axial direction and which engage, as rotation stops 46, in assigned cutouts 18 in a synchronizer hub 14 and limit rotation in the circumferential direction. However, if necessary, two, four or more indexing tabs 44 could also be provided. The indexing tabs 44 have a tab widened portion 50 on both sides oriented in the circumferential direction of the ring body 42. Alternatively, the tab widened portion 50 could also be provided on just one side of the indexing tabs 44. In the illustrated exemplary embodiment, the tab widened portions 50, pointing toward one another, of two adjacent indexing tabs 44 are spaced apart from one another. As an alternative to this, the tab widened portions 50 can also be made to extend on the ring body 42 to such an extent that the tab widened portions 50 of adjacent indexing tabs 44 are in contact with one another.

Figure 4:
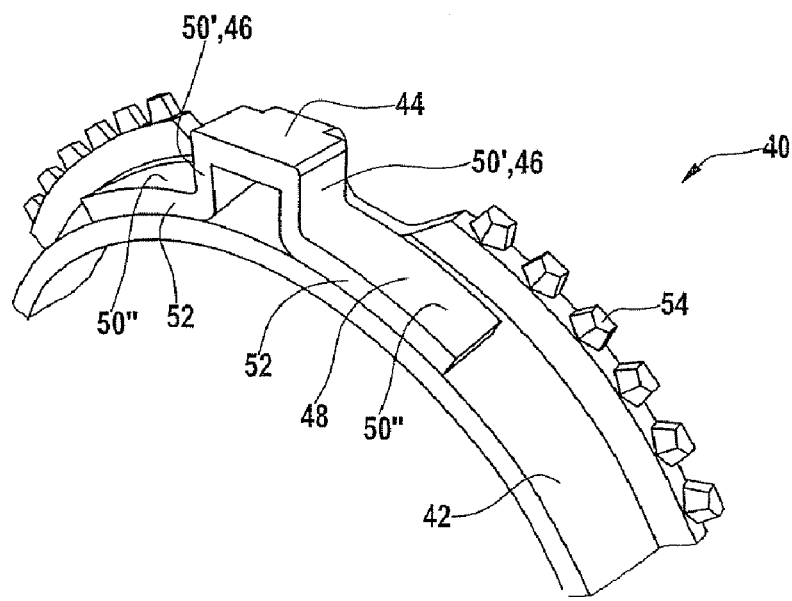
FIG. 4 is a diagrammatic, perspective view of an enlarged detail from FIG. 3.

An illustration of an enlarged detail of the sheet-metal synchronizer ring 40 shown in FIG. 3 with a tab widened portion 50 of stepped shape is shown by FIG. 4. The tab widened portion 50 adjoins both sides, pointing in the circumferential direction of the ring body 42, of the indexing tabs 44 which are bent over in the axial direction, wherein the tab widened portion 50' extends at first in a radial direction with respect to the ring body 42 before merging with a part of the tab widened portion 50" which points in the circumferential direction. The tab widened portion 50' which is oriented radially with respect to the ring body 42 constitutes a rotation stop 46 which interacts with the assigned rotation stop of the cutout 18 in a synchronizer hub 14.

That part of the tab widened portion 50" which points in the circumferential direction of the ring body 42 performs two tasks. On the one hand, the tab widened portion 50" acts as a centering element which, during the movement of the sheet-metal synchronizer ring 40 in the axial direction, keeps the sheet-metal synchronizer ring 40 centered in the cylindrical inner cavity 68 in the synchronizer hub 14. On the other hand, that side of the tab widened portion 50" which faces away from the outer toothing 54 ensures, as a bearing face 52, that the axial migration of an annular spring element 64 is limited. The bearing face 52 can, as in the illustrated case, be flush with that side of the ring body 42 which faces away from the outer toothing 54 or may be set back or proud with respect to this edge. This also applies to the embodiments illustrated in FIGS. 5 and 6.

The restriction to three indexing tabs 44, without the need for additional centering tabs 70, significantly increases the number of the locking teeth 54 compared to the known synchronizer ring 40 which is illustrated in FIG. 2, as a result of which the loading on each individual locking tooth 54 is reduced and the risk of damage to the locking teeth 54 is excluded.

Figure 5:
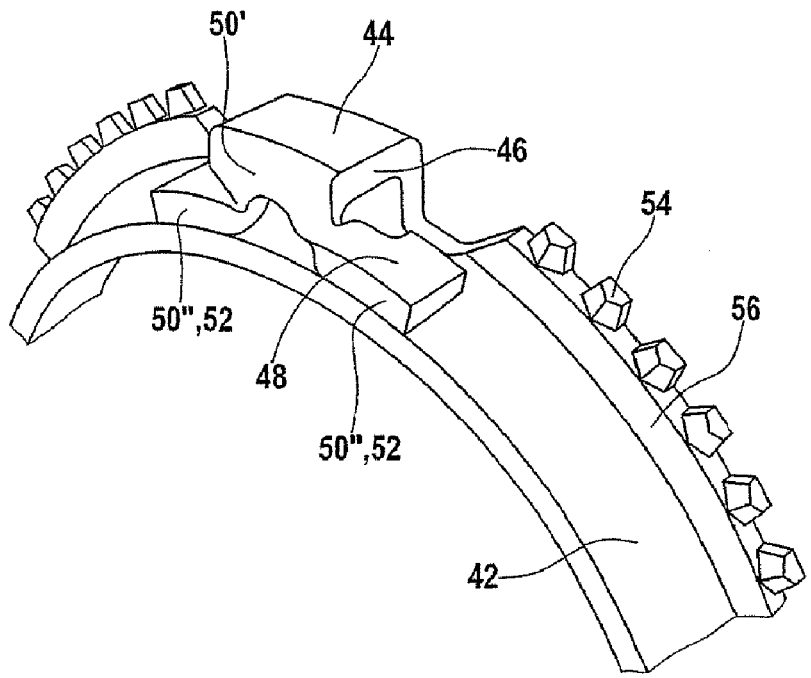
FIG. 5 is a diagrammatic, perspective view of a detail of a second embodiment of a sheet-metal synchronizer ring according to the invention.

FIG. 5 illustrates a further embodiment of a synchronizer ring 40. In this configuration, the tab widened portion 50 adjoins the axial side of the indexing tab 44 and has two wings. The tab widened portion 50' at first extends in a radial direction with respect to the ring body 42 before merging with a part of the tab widened portion 50" which is turned in the circumferential direction. In this embodiment, the side faces of the indexing tab 44 constitute a rotation stop 46 which interacts with the rotation stop of an assigned cutout 18 in a synchronizer hub 14. The outer toothing 54 of the synchronizer ring 40 is interrupted by indexing tabs 44.

Figure 6:
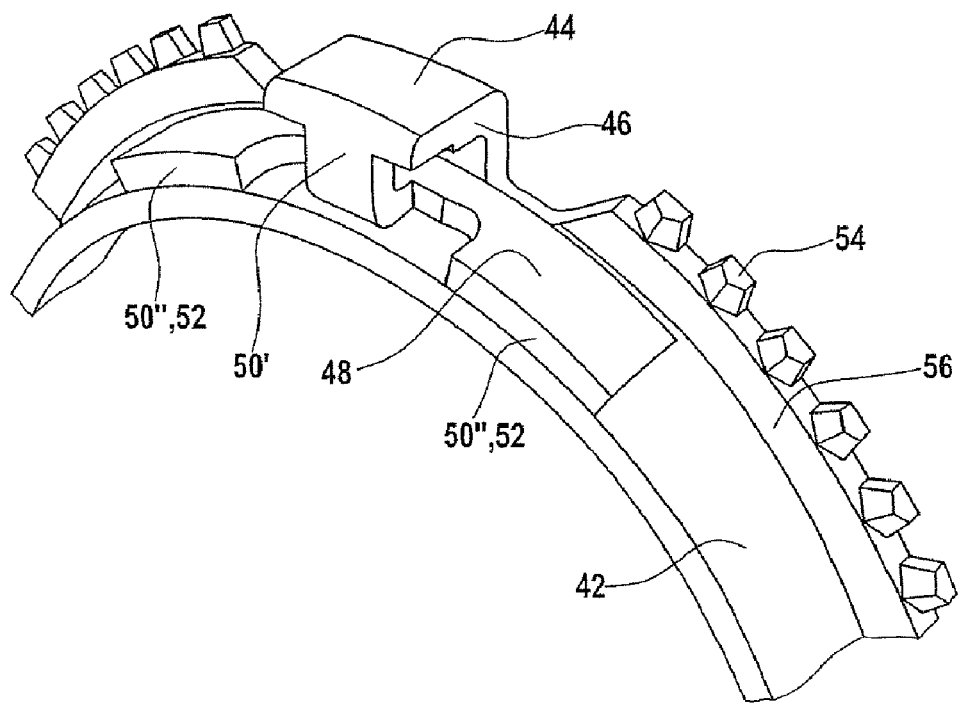
FIG. 6 is a diagrammatic, perspective view of a detail of a third embodiment of a sheet-metal synchronizer ring according to the invention.

FIG. 6 shows a further embodiment of the synchronizer ring 40, the outer toothing 54 of which is interrupted by indexing tabs 44. The tab widened portion 50 also adjoins the axial side of the indexing tab 44 and is first bent in a radial direction and then in an axial direction, wherein part of the tab widened portion 50" points in the circumferential direction of the ring body 42. In this embodiment, the side faces of the indexing tab 44 also constitute a rotation stop 46 which interacts with the rotation stop of an assigned cutout 18 in a synchronizer hub 14.

In the embodiments illustrated in FIGS. 3, 4 and 5, that part of the tab widened portion 50" which points in the circumferential direction of the ring body 42 bears against the outer cone of the ring body 42, wherein the tab widened portion 50" is secured purely by shaping technology to the conical outer face of the ring body 42. A small gap can then remain between the conical outer face of the ring body 42 and the tab widened portion 50". If there are increased mechanical requirements, the tab widened portion 50" is connected to the outer face of the ring body 42 in a form-locking or materially joined fashion, for example by soldering, welding or bonding.

A planar piece of sheet metal, from which a single-part synchronizer ring 40 has been manufactured, was used as the starting material. All the components of the synchronizer ring, that is to say the ring body 42, indexing tab 44, tab widened portion 50, toothing collar 56 and outer toothing 54, have been manufactured from the starting sheet metal by shaping techniques.

Figure 7A:
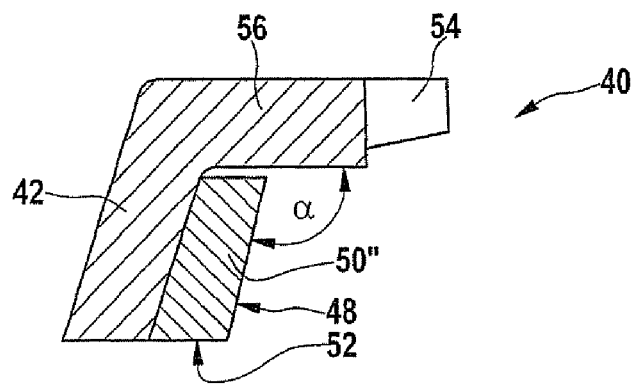
FIGS. 7A-7D are diagrammatic, cross-sectional views through a sheet-metal synchronizer ring according to the invention, at a location at which a tab widened portion is located in a circumferential direction.

FIGS. 7A-7D are schematic illustrations of cross sections through four variants a), b), c) and d) for the configuration of the tab widened portion 50" in the circumferential direction. In FIG. 7A, the tab widened portion 50" has virtually the same thickness of material in the circumferential direction as the rest of the synchronizer ring 40, that is to say for example as the ring body 42 or toothing collar 56. The tab widened portion 50" bears against the outer cone of the ring body 42. An obtuse angle $\alpha$ is enclosed between that side of the tab widened portion 50" which faces away from the ring body 42 and the toothing collar 56.

The bearing face 52 for limiting the axial migration of an annular spring element 64 terminates flush with the end of the ring body 42. However, the bearing face 52 can also be set back or proud with respect to the face which terminates the ring body 42. This also applies to the variants b), c) and d).

Figure 7B:
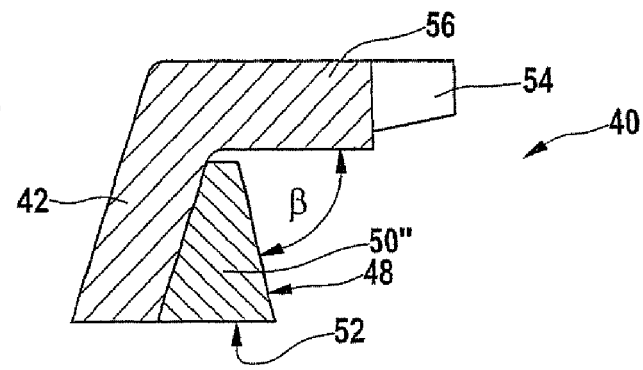

FIG. 7B shows a tab widened portion 50" which is stamped in a wedge shape and bears against the outer cone of the ring body 42 and has a side lying opposite the ring body 42 which encloses an acute angle $\beta$ with the toothing collar 56. The wedge-shaped configuration of the tab widened portion 50" ensures that the synchronizer ring 40 is centered in a cylindrical inner cavity 68 in a synchronizer hub 14.

Figure 7C:
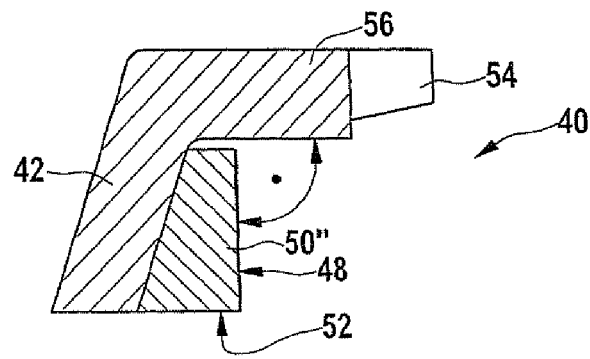

FIG. 7C also shows a tab widened portion 50" which is stamped in a wedge shape but whose stamping has been carried out in such a way that that side of the tab widened portion 50" which faces away from the ring body 42 forms a cylindrical face and ensures the centering of the synchronizer ring 40 in the inner cavity 68 in a synchronizer hub 14, wherein the synchronizer ring 40 is guided along the cylindrical face. That side of the tab widened portion 50" which faces away from the ring body 42 encloses a right angle with the toothing collar 56.

Figure 7D:
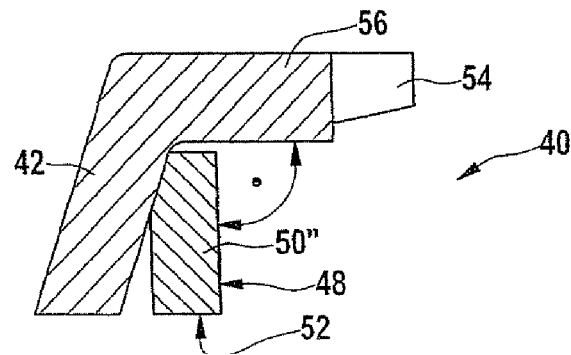

In FIG. 7D, the tab widened portion 50" has virtually the same thickness of material in the circumferential direction as the rest of the synchronizer ring 40, that is to say, for example, as the ring body 42 or the toothing collar 56. The tab widened portion 50" bears partially against the outer cone of the ring body 42. A right angle is enclosed between that side of the tab widened portion 50" which faces away from the ring body 42 and the toothing collar 56. The outer face 48 of the tab widened portion 50" forms a cylindrical face which ensures the centering of the synchronizer ring 40 in the inner cavity 68 in a synchronizer hub 14, wherein the synchronizer ring 40 is guided along the cylindrical face.

The sheet-metal synchronizer ring 40 is first manufactured in a known fashion by punching out a blank which has the required shape including indexing tabs 44 with tab widened portion 50 in one coherent piece. In a plurality of shaping steps, the punched-out blank is worked into the final form shown in FIGS. 3 to 7. For this purpose, the ring body 42 is pulled into shape and the toothing 54 stamped in. In an intermediate step, the tab widened portion 50 is stamped into a wedge shape corresponding to the cone angle of the ring body 42 in order to form a cylindrical outer face after the shaping process. In addition, during this fabrication step the thickness of the tab widened portion 50 is stamped to the necessary degree in order to set the precise outer diameter for the centering process. After this, the tab widened portions 50 are shaped, wherein bending grooves can already be stamped into the blank as a shaping aid in the tab widened portions which are to be shaped, the bending grooves ensuring precise formation of edges. While the first embodiment of the synchronizer ring can be manufactured by a simple shaping operation, the two other embodiments permit precise formation of the lateral bearing faces.

The invention claim is:

1. A sheet-metal synchronizer ring for a synchronizing device, the sheet-metal synchronizer ring comprising:
    a conical ring body having an outer cone;
    an outer toothing for blocking an axial movement of a sliding sleeve and supported on said conical ring body; and
    at least one indexing tab bent in an axial direction and limits a rotation of the sheet-metal synchronizer ring in a synchronizer hub, said indexing tab having a tab widened portion on at least one side and supported on said conical ring body, said tab widened portion oriented partially radially and partially in a circumferential direction with respect to said conical ring body, said tab widened portion having a part oriented in the circumferential direction and bearing against said outer cone of said conical ring body.

2. The synhronizer ring according to claim 1, wherein said tab widened portion is embodied as a centering element for centering the sheet-metal synchronizer ring in the synchronizer hub.

3. The synchronizer ring according to claim 1, wherein said tab widened portion extends from said indexing tab in one of a circumferential direction and in an axial direction with respect to said conical ring body.

4. The synchronizer ring according to claim 1, wherein said indexing tab and said tab widened portion have a same thickness of material as a rest of the sheet-metal synchronizer ring.

5. The synchronizer ring according to 1,
    further comprising a toothing collar bearing said outer toothing; and
    wherein a side, facing away from said conical ring body, of said part of said tab widened portion which is oriented in the circumferential direction forms an obtuse angle with said toothing collar.

6. The synchronizer ring according to 1, wherein said part of said tab widened portion which is oriented in the circumferential direction is stamped in a wedge shape.

7. The synchronizer ring according to 1,
    further comprising a toothing collar bearing said outer toothing; and
    wherein a side, facing away from said conical ring body, of said part of said tab widened portion which is oriented in the circumferential direction forms one of an acute angle and a right angle with said toothing collar.

8. The synchronizer ring according to 1, wherein said part of said tab widened portion which is oriented in the circumferential direction is connected to said outer cone of said conical ring body in a materially joined fashion.

9. The synchronizer ring according to claim 8, wherein said materially joined fashion is selected from the group consisiting of soldering, welding, bonding, and a form-locking connection.

10. The synchronizer ring according to claim 1, wherein said tab widened portion has a bearing face for limiting an axial migration of a spring element.

11. The synchronizer ring according to claim 1, wherein said tab widened portion is stepped shape.

12. The synchronizer ring according to claim 1, wherein said tab widened portion which extends from an axial side of said indexing tab is bent in a radial direction with respect to said conical ring body.

13. The synchronizer ring according to claim 1, wherein said tab widened portion extending from an axial side of said indexing tab is bent in the circumferential direction.

14. The synchronizer ring according to claim 1, wherein the synchronizer ring is fabricated in one piece.

15. The synchronizer ring according to 1, wherein said part of said widened portion of said indexing tab which is oriented in the circumferential direction is spaced apart from a further part of a further tab widened portion of an adjacent indexing tab which is oriented in the circumferential direction.

16. The synchronizer ring according to 1, wherein said part of said tab widened portion of said indexing tab which is oriented in the circumferential direction is in contact with a corresponding further part of a further tab widened portion of an adjacent indexing tab.

17. The synchronizer ring according to claim 1, wherein said indexing tab, said tab widened portion, said conical ring body, and said outer toothing are fabricated as one piece.

* * * * *